United States Patent
De et al.

(10) Patent No.: US 9,152,405 B2
(45) Date of Patent: *Oct. 6, 2015

(54) RAPID PROVISIONING OF VIRTUAL MACHINES BASED ON MULTI-DIMENSIONAL USER REQUEST PATTERNS IN A CLOUD

(75) Inventors: Pradipta De, New Delhi (IN); Manish Gupta, New Delhi (IN); Manoj Soni, Rajasthan (IN); Aditya Thatte, Pune (IN)

(73) Assignee: International Business Machines Corporation, Armonk, NY (US)

(*) Notice: Subject to any disclaimer, the term of this patent is extended or adjusted under 35 U.S.C. 154(b) by 458 days.

This patent is subject to a terminal disclaimer.

(21) Appl. No.: 13/214,491

(22) Filed: Aug. 22, 2011

(65) Prior Publication Data

US 2013/0055241 A1    Feb. 28, 2013

(51) Int. Cl.
G06F 9/455 (2006.01)
G06F 9/445 (2006.01)

(52) U.S. Cl.
CPC .............. G06F 8/63 (2013.01); G06F 9/45533 (2013.01)

(58) Field of Classification Search
None
See application file for complete search history.

(56) References Cited

U.S. PATENT DOCUMENTS

| | | | |
|---|---|---|---|
| 6,629,138 B1 * | 9/2003 | Lambert et al. | 709/224 |
| 6,779,119 B1 * | 8/2004 | Moshfeghi et al. | 726/23 |
| 6,874,031 B2 * | 3/2005 | Corbeil | 709/229 |
| 7,246,200 B1 | 7/2007 | van Rietschote et al. | |
| 2005/0198303 A1 | 9/2005 | Knauerhase et al. | |
| 2007/0094666 A1 * | 4/2007 | Ode | 718/104 |
| 2007/0288224 A1 * | 12/2007 | Sundarrajan et al. | 703/22 |
| 2008/0222640 A1 | 9/2008 | Daly et al. | |
| 2008/0307414 A1 | 12/2008 | Alpern et al. | |
| 2009/0070770 A1 * | 3/2009 | Gasca et al. | 718/104 |
| 2010/0023942 A1 | 1/2010 | Shev et al. | |
| 2010/0235579 A1 | 9/2010 | Biles et al. | |
| 2011/0238838 A1 * | 9/2011 | Avalani et al. | 709/226 |

FOREIGN PATENT DOCUMENTS

| | | | |
|---|---|---|---|
| WO | 2007036072 A1 | 4/2007 | |
| WO | 2009048894 A2 | 4/2009 | |
| WO | 2010127365 A1 | 11/2010 | |

OTHER PUBLICATIONS

Chen et al. An Efficient Resource Management System for On-Line Virtual Cluster Provision, Cloud Computing, 2009. Cloud '09 IEEE International Conference on Issue, Sep. 21-25, 2009, pp. 72-79.

Amazon EC2, http://aws.amazon.com/ec2/, Oct. 10, 2011.

(Continued)

*Primary Examiner* — Gregory A Kessler
(74) *Attorney, Agent, or Firm* — Ryan, Mason & Lewis, LLP

(57) ABSTRACT

An apparatus and an article of manufacture for pre-provisioning a virtual machine instance include deriving a weight function for at least one virtual machine request based on historical data of the at least one virtual machine request to create a weighted virtual machine request for each request, capturing at least one inter-arrival pattern of requests, and applying the at least one pattern to the at least one weighted request to create a prioritized ordering of the at least one weighted request, and pre-provisioning at least one instance of a virtual machine image based on the prioritized ordering of the at least one weighted request.

14 Claims, 4 Drawing Sheets

(56) References Cited

OTHER PUBLICATIONS

Chen et al., Rapid Provisioning of Cloud Infrastructure Leveraging Peer-to-Peer Networks. In Proceedings of the 29th IEEE International Conference on Distributed Computing Systems Workshops, ICDCSW 2009.
Machida et al. Just-in-Time Server Provisioning Using Virtual Machine Standby and Request Prediction. In Proceedings of the International Conference on Autonomic Computing, ICAC 2008.
Venugopal et al., Openpex: An Open Provisioning and Execution System for Virtual Machines. Tech. rep. 2009.
Ryu et al., RC2—A Living Lab for Cloud Computing. In Proceedings of the 24th LISA, 2010.
Drexl et al., Lot Sizing and Scheduling—Survey and Extensions. In European Journal of Operations Research, 1997.
Benjamin Doerr, Generating Randomized Roundings with Cardinality Constraints and Derandomizations. In 23rd Annual Symposium of Theoretical Aspects of Computer Science, 2006.
Podlipnig et al., A Survey of Web Cache Replacement Strategies, ACM Computing Survey, 2003.
Iceberg, An Image Streamer for Space and Time Efficient Provisioning of Virtual Machines, ICPP Workshop 2008.
Forecasting for Cloud Computing On-Demand Resources Based on Pattern Matching. Cloud Com 2010.
Twinkle, A Fast Resource Provisioning Mechanism for Internet Services, IEEE Infocomm 2011.
U.S. Appl. No. 12/904,259, filed Oct. 14, 2010, titled, System, Method and Computer Program Product for Preprovisioning Virtual Machines.
Gong et al. Press: PRedictive Elastic ReSource Scaling for Cloud Systems, Proceedings of the 6th International Conference on Network and Service Management CNSM, 2010, IEEE Conference Publications, pp. 9-16.
Fagni et al. Boosting the Performance of Web Search Engines: Caching and Prefetching Query Results by Exploiting Historical Usage Data, ACM Transactions on Information Systems, vol. 24, No. 1, Jan. 2006, pp. 51-78.
Lempel et al. Predictive Caching and Prefetching of Query Results in Search Engines, WWW'03 Proceedings of the International Conference on World Wide Web, Jan. 2003, pp. 19-28.
Jiang et al. ASAP: A Self-adaptive Prediction System for Instant Cloud Resource Demand Provisioning, 2011 IEEE 11th International Conference on Data Mining (ICDM), 2011, pp. 1104-1109.

* cited by examiner

RAPID PROVISIONING OF VIRTUAL MACHINES BASED ON MULTI-DIMENSIONAL USER REQUEST PATTERNS IN A CLOUD

FIELD OF THE INVENTION

Embodiments of the invention generally relate to information technology, and, more particularly, to virtual machine technology.

BACKGROUND OF THE INVENTION

Growing adoption of cloud technology has triggered interest in making cloud service offerings more efficient. One feature of a cloud service is the ability to provision a compute instance to a user. Server instance provisioning goes through an elaborate workflow. Accordingly, optimizing any step in this workflow can potentially reduce the turnaround time.

Providing Infrastructure-as-a-Service (IaaS) or Platform-as-a-Service (PaaS) has been gathering momentum. The key enabler for these services is the cloud architecture. One selling point for the cloud is the idea of getting a virtual server with user-specified configuration on demand. Although on demand service refers to the delivery of a server as requested by the user, the speed of provisioning is also of essence when it comes to user satisfaction. Currently, most of the public cloud providers take time in the order of few minutes to bring a virtual server online. With an ideal goal of virtualizing an enterprise, including user desktops, existing server provisioning times of minutes is too slow. Assuming a scenario where all the desktops of a group of employees are instances in a cloud and each user releases the instance every day, ideal server provisioning time should at least match the boot time for a personal desktop computer.

As noted above, server provisioning in a cloud follows an elaborate workflow. The flow begins with the user making a request for a specific image type; thereafter the image is searched for in an image repository and transferred to the compute nodes. This is followed by attaching of the remote storage space, and finally the server is brought online, with requisite (often user-defined) configurations. Thus, the trick in reducing the server provision time lies either in reducing the time spent in the workflow, or to be prepared beforehand with a server instance for the user. While every cloud provider is focused in optimizing their provisioning workflow, these techniques rely on specific architectures. Therefore, a need exists for the use of prediction techniques to forecast the arrival of provision requests to allow the cloud to setup a server for a user a priori.

SUMMARY OF THE INVENTION

In one aspect of the present invention, techniques for rapid provisioning of virtual machines (VMs) based on multidimensional user request patterns in a cloud are provided. An exemplary computer-implemented method for pre-provisioning a virtual machine instance can include steps of deriving a weight function for at least one virtual machine request based on historical data of the at least one virtual machine request to create a weighted virtual machine request for each request, capturing at least one inter-arrival pattern of requests, and applying the at least one pattern to the at least one weighted request to create a prioritized ordering of the at least one weighted request, and pre-provisioning at least one instance of a virtual machine image based on the prioritized ordering of the at least one weighted request.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

As described herein, an aspect of the present invention includes rapid provisioning of virtual machines in a cloud environment. One or more embodiments of the invention include minimizing or decreasing the time to fetch and expand an image by pre-provisioning server instances of chosen image templates. In essence, images are cached a priori, thereby allowing the system to deliver servers based on a cached image much faster. Accordingly, an aspect of the invention includes using available infrastructure while pre-provisioning servers without incurring additional delays to the incoming requests.

One or more embodiments of the invention include adopting a policy of filling-up unused space in compute nodes with pre-fetched images by observing several characteristics in the request arrival (such as popularity of an image) and grouping requests for an image in a short span of time. Additionally, as used herein, the terms caching and pre-provisioning are used interchangeably to refer to the concept of creating a server instance from a virtual image template a priori.

By way of example, consider the following scenario. When a user requests a new virtual machine (VM) from a cloud, there is a delay in provisioning the VM. Delays are mainly due to selecting an image from a repository, and unpacking the image on a physical host. Consider also that the same users may keep coming back requesting the same image. Accordingly, an aspect of the invention includes reducing the time spent in provisioning the VM for a user.

Figure 1:
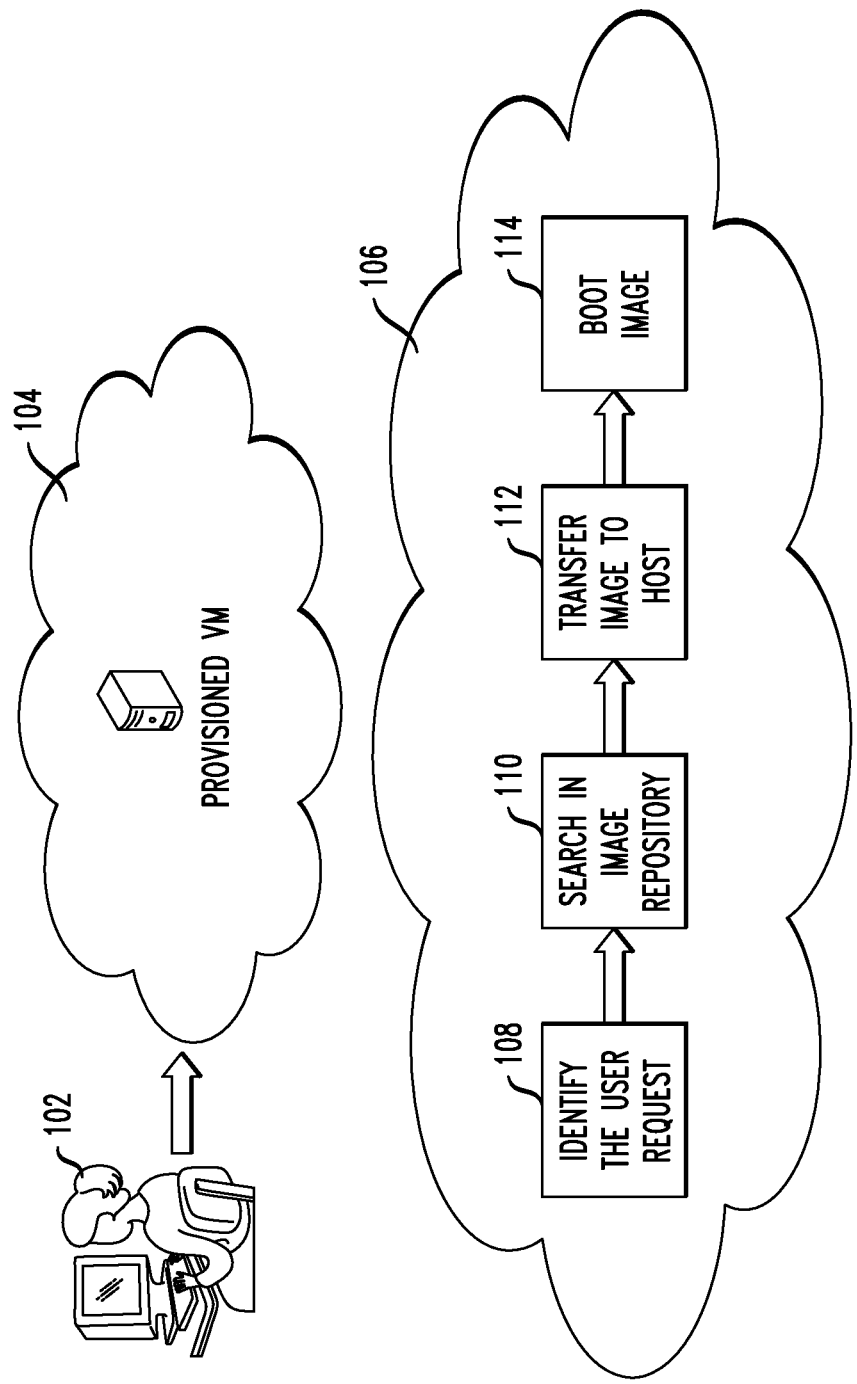
FIG. 1 is a diagram illustrating a context diagram for provisioning a user-requested virtual machine (VM), according to an embodiment of the present invention.

FIG. 1 is a diagram illustrating a context diagram for provisioning a user-requested virtual machine (VM), according to an embodiment of the present invention. By way of illustration, FIG. 1 depicts a user 102, a provisioned VM 104 within a cloud and a cloud 106. The cloud carries out steps 108 through 114. Step 108 includes identifying the user request. Step 110 includes searching for the request in an image repository. Step 112 includes transferring the image to a host, and step 114 includes booting the image. Booting of an image involves bringing up the server instance based on the template image, but does not contain any user-specific configuration such as network address, software configuration, etc.

As detailed herein, if the same image is requested repeatedly, an aspect of the invention includes preemptively provisioning this image to save time fetching from the repository. Also, if requests for an image identification (ID) arrive in bursts, an aspect of the invention includes tackling bursts by pre-provisioning multiple instances of the expected image identification. Further, if there is a pattern in the arrival of the instance requests for an image identification, one or more embodiments of the invention include exploiting the pattern to prioritize the pre-provision of an image identification that is highly probable to arrive.

By way of illustration, consider the following variables as used herein:

C=Number of instances that can be kept in the Cache/Pre-provisioned Inventory.

T=History window to analyze pattern.

B=Burst requests for an image type.

E=Time gap of an arrival from current time.

Accordingly, one embodiment of the invention includes using frequency to order the IDs: f=(# of requests for an ID/total # of requests). Additionally importance can be given to more recent requested IDs: R=1−E/T. As noted herein, there can be bursts. An aspect of the invention uses burst information in a history to size the number of cache entries for an ID. As such, w=min (f*R*C, B), where B is the maximum burst for the image ID, and w is the number to be kept in the cache.

Because "w" can be a floating point number, a simple rounding can lead to exceeding the cache size. There are multiple approaches to fill the cache, such as flooring the values, use of a probabilistic rounding technique wherein a value is rounded based on a probability proportional to the fractional value of the element, etc. The final goal is to ensure that "w" values are all integral, and that the total available cache size is not exceeded. If available, the inter-arrival distribution of an ID is also used to compute the likelihood of arrival of an ID to pre-provision it. The likelihood value is used to order the importance of storing an ID. An ID with a higher likelihood of arrival is chosen to be placed in cache before an ID with a lower likelihood.

As also detailed herein, while existing caching methods assume only one instance in cache, an aspect of the invention include provisioning multiple instances of an image ID, as such a need may arise. On a cache hit, the cache entry is consumed and must be replenished. Further, as described herein, predicting a new cache composition takes into account frequency and recency of arrival, nature of bursts, and an inter-arrival pattern of arrivals.

Pre-provisioning techniques of one aspect of the invention can include the following. The available space for caching an image may vary depending on the total infrastructure available and load of incoming requests. On arrival of each request, either for provisioning a new instance or deletion of an existing instance, one embodiment of the invention includes computing the most suitable composition for the cache, given the available space. In order to trigger the pre-provisioning of the images computed by the caching strategy, the system must have resources available in terms of threads to service the request. If there are pending user provision or deletion requests, priority can be given to the user requests over any activity related to pre-provisioning.

As such, consider the following notation and subsequent exposition of multiple caching strategies that can be applied in order to address observations that can be present in user request arrivals in a cloud.

R=Number of user requests for new image instances within a given time window.

I=Number of image templates used to create the R requests within a given time window.

$f_{ij}$=1 if the $i^{th}$ request is for the template j; otherwise 0.

C=Maximum number of image instances that can be kept in the pre-provisioned inventory.

One caching technique that can be used in termed most frequently used (MFU). In this technique, the popularity of an image template is taken into account. If an image type is being requested more frequently than one or more others, this caching technique will allocate more instances of that image. The formula to compute the relative importance of an image template, denoted $w_i$, is defined as follows:

$$w_i := \Sigma_{1 \leq j \leq R} f_{ij} / \Sigma_{1 \leq i \leq I} \Sigma_{1 \leq j \leq R} f_{ij} \qquad (1)$$

where the numerator is essentially the total number of requests corresponding to a given image template i, while the denominator is the total number of requests R within a fixed window in the past. The history window can be chosen in terms of requests arrived in a fixed time interval before a current time, or simply the fixed number of requests arrived before a current time. Once the $w_i$ is calculated, this approach computes the number of instances of each image template to be put in cache as follows:

$$C_i = w_i * C \qquad (2)$$

Note that C, includes real numbers and a rounding may have to be performed, as further described herein.

Another caching technique is termed most recently used (MRU). The MFU approach assumes that the user request arrival distribution for different templates is stationary. However, as detailed, for example, in FIG. 2, for a number of templates the users can possibly stop requesting the image template after some time. That is, the request arrival distribution can change. If an image template was requested long back in the past, the likelihood of it being requested again can be low. The MRU scheme adjusts the weight associated with an image template by attenuating the contribution of instances that appeared earlier in time.

There are multiple ways of attenuating the values. For instance, a naïve approach includes reducing the values proportional to the time elapsed since an instance's arrival. In yet another approach, one can decide to give a very high importance to the recent image types with the assumption that image types go out of use very quickly.

By way of illustration, define A(x, y) to be the attenuation function, which, for example, can be defined as: A(x, y)=y*exp(−x). The attenuated weight, $w'_i$, is a modified expression of Equation 1 and is given as:

$$w'_i := \Sigma_{1 \leq j \leq R} A(j, f_{ij}) / \Sigma_{1 \leq i \leq I} \Sigma_{1 \leq j \leq R} A(j, f_{ij}) \qquad (3)$$

The above new weights can be used in Equation (2) to compute the number of instances of an image template to be kept in the cache.

An aspect in any cache filling strategy is that every time a new entry goes in, it may evict some entry from the cache. For every entry that is evicted without being used, the cost of provisioning it is to be paid. Therefore, it is desirable to fill the cache carefully. In the above-noted steps, the strategy includes filling the cache in proportion to the weights computed (see Equation (2)). In a burst adjustment step, an aspect of the invention includes checking for the largest burst that an image template has seen in the past. The largest burst for an image template, $B_i$, is used to restrict the number of entries for the template to be placed in the cache. The following formula improvises on Equation (2) as follows:

$$\text{Burst adjusted } C_i = \min(w_i * C, B) \quad (4)$$

Burst adjustment helps in identifying the number of instances that can be requested in a sufficiently small time interval. One embodiment of the invention can define a sufficiently small time interval as an average time taken in provisioning an instance for cache. Such a technique is effective in reducing the number of deletions because it attempts to forecast the number of instances of a template that may be requested.

Additionally, an aspect of the invention includes fragmentation prevention. The numbers $C_i$ in Equation (2) or Equation (4) are real numbers and therefore must be converted to integers. In the process, some image types may not get a place in cache, whereas others may get more.

A naïve rounding scheme can use a simple rounding scheme, as per the definition of mathematical rounding. However, this will lead to $\Sigma_i C_i$ exceeding $C$, the maximum number of entries in the cache. Another possibility of rounding revolves around the idea of randomized rounding with capacity constraint where the "error" in count of each image template is minimized/decreased compared to what is being suggested by cache policies. For example, if cache policies decide to put three image templates with a count of their instances as 1.7, 2.6, and 5.7, where total cache size is 10 instances, then this scheme will return 2, 2, and 6 while simple math rounding with total of 10 cached instances will be 1, 3, and 6. Note that the error in this scheme is 1.1 while the error in simple math rounding is 1.4. If a large number of image templates are present, this scheme will maximize the number of templates that can be chosen to be kept in cache as well.

Figure 2:
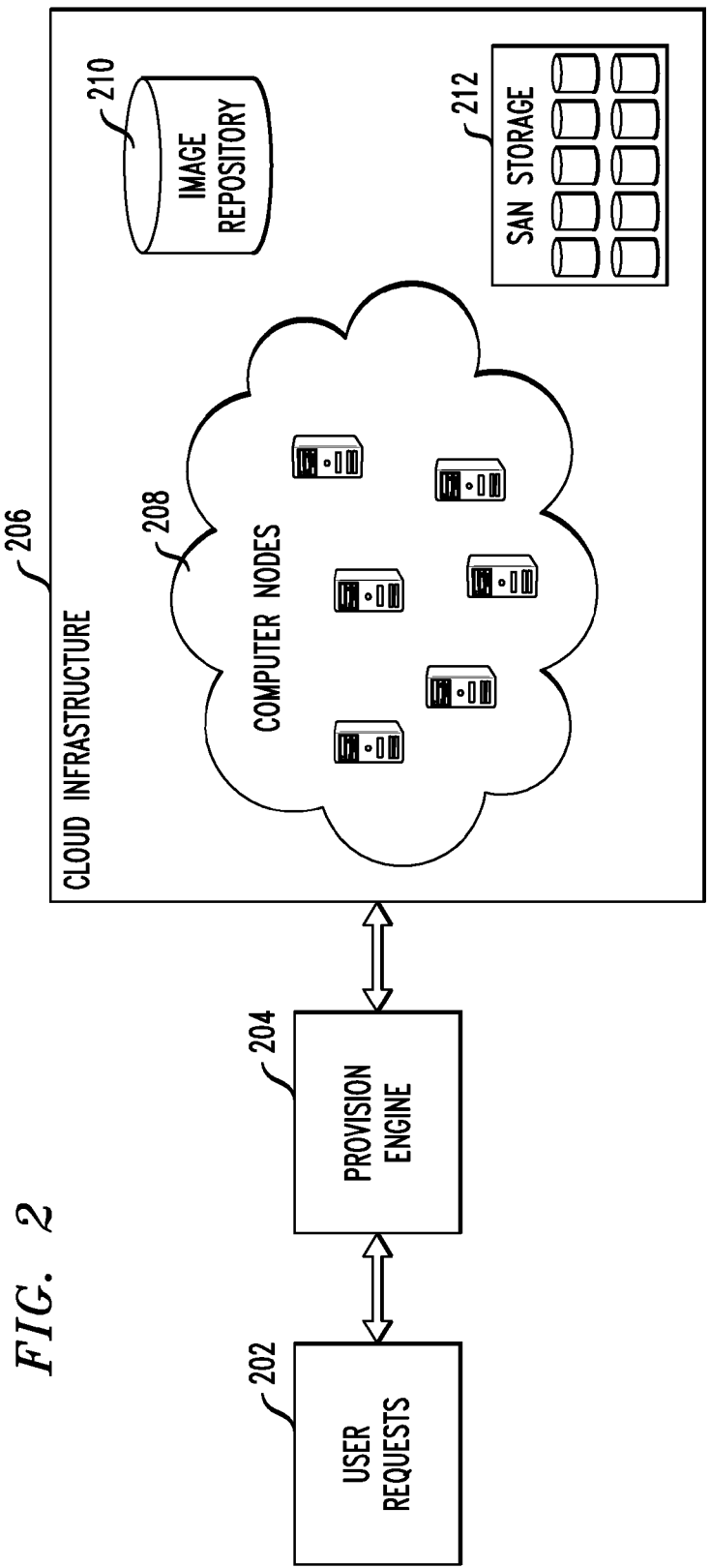
FIG. 2 is a diagram illustrating cloud architecture for server provisioning, according to an embodiment of the present invention.

FIG. 2 is a diagram illustrating cloud architecture for server provisioning, according to an embodiment of the present invention. By way of illustration, FIG. 2 depicts an overview of a cloud infrastructure 206, including compute nodes 208, an image repository 210 and a storage area network (SAN) storage 212. User requests 202 for provisioning and deletion of an instance are received by a cloud provision engine 204, which triggers the workflow in the cloud infrastructure 206. The workflow can include the following.

A user request 202 can be of different types, such as provision a server, delete a server, etc. The provision engine 204 parses the request to identify the type of request. On provision request, the provision engine 204 talks to the image repository 210 to locate the appropriate image template. The image template is then fetched into one of the cloud compute nodes 208, which usually has a SAN storage 212 connected to it. The storage can also be local storage. It is necessary that enough space is available to accommodate the complete image template to be stored once it is fetched from the image repository. Once the complete image template file has been fetched into the compute node, it is booted up.

A trace provides the time taken from the request arrival to the request service completion for each request. This is termed herein as the provision time, which includes the time a request may have been queued in the provision engine queue. Actual service time, which is the time to fetch an image from repository and expansion, will not include the queuing time. Because an interest lies in the service time analysis, it can be assumed that there are a potentially infinite number of threads available to service a request as soon as it arrives in the system.

The caching system of one embodiment of the invention is modeled by introducing events representing the pre-provisioning activities. Each arrival request triggers a computation of the cache composition, and determines which entries must be evicted and inserted into the cache. This activity is modeled using cache-deletion and cache insertion events. The time taken for these activities can be taken from a distribution model or assumed to be constant duration activity.

Figure 3:
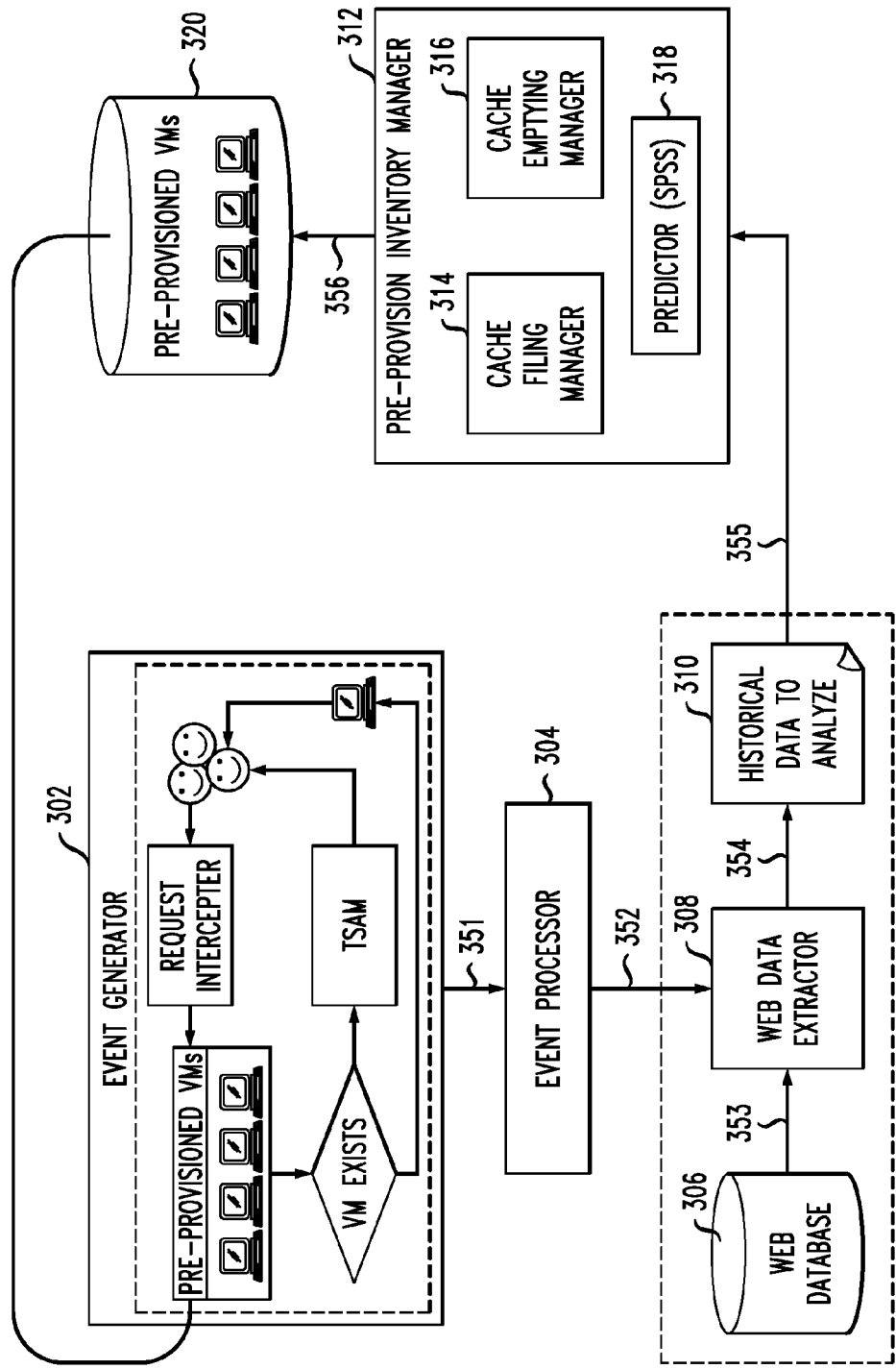
FIG. 3 is a block diagram illustrating an example embodiment, according to an aspect of the invention.

FIG. 3 is a block diagram illustrating an example embodiment, according to an aspect of the invention. By way of illustration, FIG. 3 depicts an event generator module 302, an event processor module 304, a web database 306, a web data extractor module 308 and a historical data module 310. The event generator module 302 includes a request interceptor, which parses the request to detect the image template being requested. If the image template being requested is present in the set of pre-provisioned VMs, the user is given access to the instance immediately. Otherwise, the request is forwarded to Tivoli Service Automation Manager (TSAM) for handling. TSAM follows its usual workflow of checking for the image template in the image repository, and fetching it for creating the server instance.

Further, FIG. 3 depicts a pre-provision inventory manager module 312, which includes a cache filling manager module 314, a cache emptying manager module 316 and a predictor (SPSS) module 318. Additionally, FIG. 3 depicts a database 320 of pre-provisioned VMs. As also depicted in FIG. 3, step 351 includes request insertion into the pre-provision system, step 352 includes analyzing history of requests, step 355 includes computing future cache composition, and step 356 includes triggering pre-fetching of the image templates from image repository and refilling the cache. Also, step 353 includes pulling serviced request information from a database, and step 354 includes filtering the relevant data for use in cache prediction logic.

Figure 4:
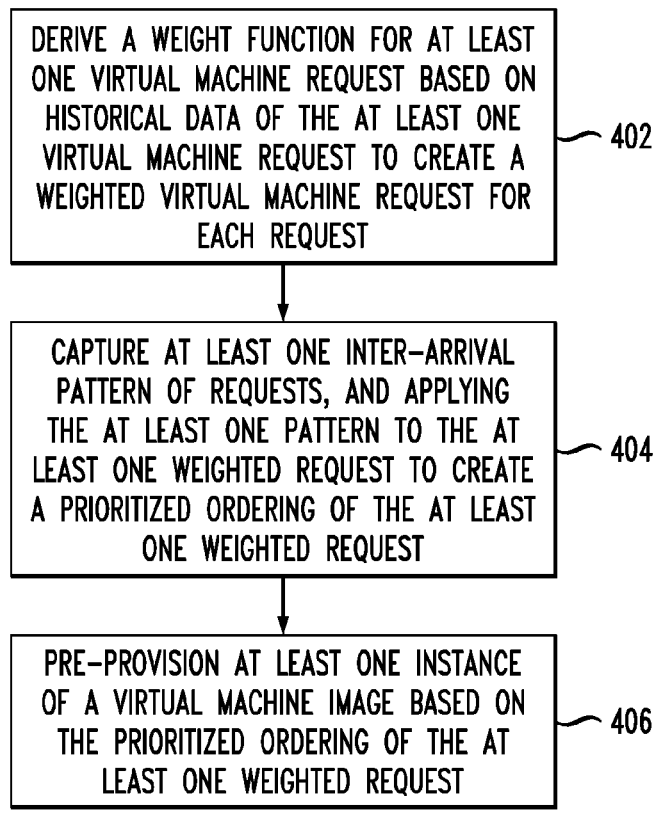
FIG. 4 is a flow diagram illustrating techniques for pre-provisioning a virtual machine instance, according to an embodiment of the invention.

FIG. 4 is a flow diagram illustrating techniques for pre-provisioning a virtual machine instance, according to an embodiment of the present invention. Step 402 includes deriving a weight function for at least one virtual machine request based on historical data of the at least one virtual machine request to create a weighted virtual machine request for each request. This step can be carried out, for example, using a historical data module. Historical data can include frequency data, popularity data, recency of arrival of user request for an image type, etc. Additionally, deriving a weight function for a virtual machine request can include giving preference to a more recently arrived request than an older request.

Also, deriving a weight function for a virtual machine request based on historical data of at least one virtual machine request includes determining a measure to rate image types in decreasing order of likelihood of arrival, as well as computing a conditional probability of a future arrival of an image type based on elapsed time since a last request for the image type.

Step 404 includes capturing at least one inter-arrival pattern of requests, and applying the at least one pattern to the at least one weighted request to create a prioritized ordering of the at least one weighted request. This step can be carried out, for example, using a pre-provision inventory manager module. Capturing an inter-arrival pattern of requests includes analyzing a user request history log.

Step 406 includes pre-provisioning at least one instance of a virtual machine image based on the prioritized ordering of the at least one weighted request. This step can be carried out, for example, using a pre-provision inventory manager module. Pre-provisioning at least one instance of a virtual machine image based on the prioritized ordering of the at least one weighted request includes occupying unused space in a compute node with at least one pre-fetched images and grouping requests for an image over a span of time.

The techniques depicted in FIG. 4 can additionally include responding to a virtual machine request via identifying an image corresponding to the request, identifying the image in a pre-provisioned image repository, transferring the image to a host, and booting the image. Additionally, one or more embodiments of the invention include computing a number of instances of a virtual machine image to be maintained in cache using burst information from the historical data of at least one virtual machine request comprises. Computing a number of instances of a virtual machine image to be maintained in cache can include using a rounding approach to compute an integral value for an instance count.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include an event processor module, a web data extractor module, a historical data module, a pre-provision inventory manager module, a cache filling manager module, a cache emptying manager module and a predictor (SPSS) module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 5:
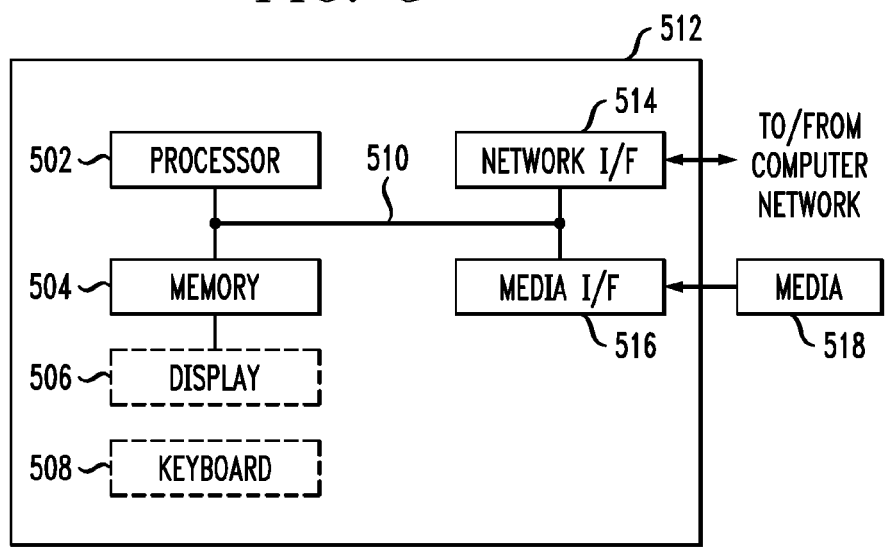
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer-readable program code embodied thereon. Also, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. Accordingly, an aspect of the invention includes an article of manufacture tangibly embodying computer-readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, predicting a new cache composition taking into account frequency and recency of arrival, nature of bursts, and inter-arrival pattern of arrivals.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a computer-readable storage medium having computer-readable instructions tangibly embodied thereon which, when implemented, cause a computer to carry out a plurality of method steps comprising:
    deriving a weight function for multiple virtual machine requests based on historical data of the multiple virtual machine requests to create a weighted virtual machine request for each of the multiple requests, wherein historical data of the multiple virtual machine requests comprises frequency data;
    capturing at least one inter-arrival pattern of requests, and applying the at least one pattern to each of the multiple weighted virtual machine requests to create a prioritized ordering of the multiple weighted virtual machine requests; and
    pre-provisioning at least one instance of a virtual machine image based on the prioritized ordering of the multiple weighted virtual machine requests, wherein pre-provisioning comprises caching the at least one instance of the virtual machine image in a database.

2. The article of manufacture of claim 1, wherein historical data of the multiple virtual machine requests further comprises at least one of popularity data and recency of arrival of user request for an image type.

3. The article of manufacture of claim 1, wherein deriving a weight function for multiple virtual machine requests based on historical data of the multiple virtual machine requests comprises giving preference to a more recently arrived request than an older request.

4. The article of manufacture of claim 1, wherein deriving a weight function for multiple virtual machine requests based on historical data of the multiple virtual machine requests comprises determining a measure to rate image types in decreasing order of likelihood of arrival.

5. The article of manufacture of claim 1, wherein deriving a weight function for multiple virtual machine requests based on historical data of the multiple virtual machine requests comprises computing a conditional probability of a future arrival of an image type based on elapsed time since a last request for the image type.

6. The article of manufacture of claim 1, wherein the computer-readable instructions which, when implemented, further cause a computer to carry out a method step comprising:
    computing a number of instances of a virtual machine image to be maintained in cache using burst information from the historical data of the multiple virtual machine requests.

7. The article of manufacture of claim 1, wherein pre-provisioning at least one instance of a virtual machine image based on the prioritized ordering of the multiple weighted virtual machine requests comprises occupying unused space in a compute node with at least one pre-fetched images and grouping requests for an image over a span of time.

8. A system for pre-provisioning a virtual machine instance, comprising:
    at least one distinct software module, each distinct software module being embodied on a tangible computer-readable medium;
    a memory; and
    at least one processor coupled to the memory and operative for:
        deriving a weight function for multiple virtual machine requests based on historical data of the multiple virtual machine requests to create a weighted virtual machine request for each of the multiple requests, wherein historical data of the multiple virtual machine requests comprises frequency data;
        capturing at least one inter-arrival pattern of requests, and applying the at least one pattern to each of the multiple weighted virtual machine requests to create a prioritized ordering of the multiple weighted virtual machine requests; and
        pre-provisioning at least one instance of a virtual machine image based on the prioritized ordering of the multiple weighted virtual machine requests, wherein pre-provisioning comprises caching the at least one instance of the virtual machine image in a database.

9. The system of claim 8, wherein historical data of the multiple virtual machine requests further comprises at least one of popularity data and recency of arrival of user request for an image type.

10. The system of claim 8, wherein the at least one processor coupled to the memory operative for deriving a weight function for multiple virtual machine requests based on historical data of the multiple virtual machine requests is further operative for giving preference to a more recently arrived request than an older request.

11. The system of claim 8, wherein the at least one processor coupled to the memory operative for deriving a weight function for multiple virtual machine requests based on historical data of the multiple virtual machine requests is further operative for determining a measure to rate image types in decreasing order of likelihood of arrival.

12. The system of claim 8, wherein the at least one processor coupled to the memory operative for deriving a weight function for multiple virtual machine requests based on historical data of the multiple virtual machine requests is further operative for computing a conditional probability of a future arrival of an image type based on elapsed time since a last request for the image type.

13. The system of claim 8, wherein the at least one processor coupled to the memory is further operative for:
 computing a number of instances of a virtual machine image to be maintained in cache using burst information from the historical data of the multiple virtual machine requests.

14. The system of claim 8, wherein the at least one processor coupled to the memory operative for pre-provisioning at least one instance of a virtual machine image based on the prioritized ordering of the multiple weighted virtual machine requests is further operative for occupying unused space in a compute node with at least one pre-fetched images and grouping requests for an image over a span of time.

* * * * *